(12) United States Patent
Park et al.

(10) Patent No.: US 11,794,971 B2
(45) Date of Patent: Oct. 24, 2023

(54) LAMINATED FILM TO BE APPLIED TO ECO-FRIENDLY PACKAGING MATERIAL WITH HIGH BARRIER PROPERTIES

(71) Applicant: DONGWON SYSTEMS CORPORATION, Seongnam-si (KR)

(72) Inventors: Ki Ho Park, Yongin-si (KR); Jin Seok Choi, Pyeongtaek-si (KR); Ji Hun Kim, Incheon (KR)

(73) Assignee: DONGWON SYSTEMS CORPORATION, Seongnam-si (KR)

( * ) Notice: Subject to any disclaimer, the term of this patent is extended or adjusted under 35 U.S.C. 154(b) by 0 days.

(21) Appl. No.: 17/599,609

(22) PCT Filed: Apr. 7, 2020

(86) PCT No.: PCT/KR2020/004704
§ 371 (c)(1),
(2) Date: Sep. 29, 2021

(87) PCT Pub. No.: WO2021/010573
PCT Pub. Date: Jan. 21, 2021

(65) Prior Publication Data
US 2022/0161980 A1    May 26, 2022

(30) Foreign Application Priority Data
Jul. 17, 2019    (KR) .................. 10-2019-0086591

(51) Int. Cl.
*B65D 65/46*    (2006.01)
*B32B 7/022*    (2019.01)
(Continued)

(52) U.S. Cl.
CPC ............ *B65D 65/466* (2013.01); *B32B 7/022* (2019.01); *B32B 7/12* (2013.01); *B32B 27/10* (2013.01);
(Continued)

(58) Field of Classification Search
None
See application file for complete search history.

(56) References Cited

U.S. PATENT DOCUMENTS

| 2011/0135912 | A1  | 6/2011  | Xu |
| 2018/0346705 | A1* | 12/2018 | Janoski ................. B32B 15/14 |
| 2019/0308786 | A1* | 10/2019 | Okamoto ............. D21H 19/824 |

FOREIGN PATENT DOCUMENTS

| EP | 3461637 A1    | 3/2019 |
| JP | 2008155433 A  | 7/2008 |

(Continued)

OTHER PUBLICATIONS

International Search Report for PCT/KR2020/004704, mailing date of search report dated Jul. 14, 2020.
(Continued)

*Primary Examiner* — Ramsey Zacharia
(74) *Attorney, Agent, or Firm* — BOND SCHOENECK & KING, PLLC

(57) ABSTRACT

A laminated film for an eco-friendly packaging material, according to one embodiment, comprises: a paper layer for blocking oxygen and moisture; and a film layer that can be biodegraded or biologically disintegrated by means of at least one from among microorganisms, moisture, oxygen,
(Continued)

light and heat, wherein the oxygen transmission rate of the laminated film can be 0.01-1 cc/m² per day, and the moisture transmission rate thereof can be 0.01-1 cc/m² per day.

9 Claims, 1 Drawing Sheet

(51) Int. Cl.
    *B32B 7/12*         (2006.01)
    *B32B 27/10*       (2006.01)
    *B65D 65/40*       (2006.01)
    *B32B 27/32*       (2006.01)
    *B32B 27/28*       (2006.01)
    *B32B 27/36*       (2006.01)

(52) U.S. Cl.
    CPC .......... *B65D 65/40* (2013.01); *B32B 2250/02* (2013.01); *B32B 2307/718* (2013.01); *B32B 2307/7163* (2013.01); *B32B 2307/7244* (2013.01); *B32B 2307/7246* (2013.01); *B32B 2307/732* (2013.01); *B32B 2307/748* (2013.01); *B32B 2439/70* (2013.01)

(56) References Cited

FOREIGN PATENT DOCUMENTS

| | | | |
|---|---|---|---|
| JP | 5092389 B2 | 12/2012 | |
| JP | 2018058360 A | * 4/2018 | ............. B32B 27/00 |
| KR | 1020110068267 A | 6/2011 | |
| KR | 101066828 B1 | 9/2011 | |
| KR | 1020160064012 A | 6/2016 | |
| KR | 1020190001046 A | 1/2019 | |
| KR | 101937867 B1 | 4/2019 | |
| KR | 102083124 B1 | 2/2020 | |

OTHER PUBLICATIONS

European Search Report for 20841159.5-1107 / 4000925 PCT/KR2020/004704, date of completion of the search: Jul. 2, 2023, dated Jul. 13, 2023.

* cited by examiner

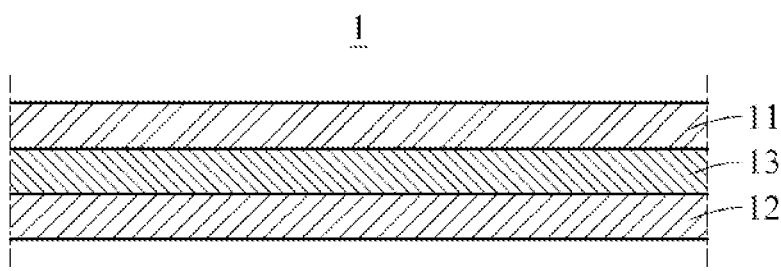

LAMINATED FILM TO BE APPLIED TO ECO-FRIENDLY PACKAGING MATERIAL WITH HIGH BARRIER PROPERTIES

CROSS REFERENCE TO RELATED APPLICATIONS

This is a National Stage Application filed under 35 U.S.C. 371 based on International Patent Application No. PCT/KR2020/004704, filed on Apr. 7, 2020, which claims priority to Korean Patent Application 10 2019 0086591 filed Jul. 17, 2019. The entire disclosures of each of the foregoing are hereby incorporated herein by reference in their entireties.

TECHNICAL FIELD

The following example embodiments relate to a laminated film to be applied to eco-friendly packaging with high barrier properties.

BACKGROUND ART

Conventional packaging includes an aluminum or aluminum-deposited film in a multi-layered laminate for blocking moisture and oxygen. However, such packaging including an aluminum material is not recyclable. In addition, the conventional packaging is not decomposed after being discarded in a general natural state, resulting in serious environmental pollution. Due to these issues, a need for packaging where, for example, the use of plastic is regulated, is growing. Therefore, there is a demand for packaging that has sufficient barrier properties to prevent the deterioration of content or food inside the packaging while containing no aluminum material, and is also biodegradable/biologically disintegrable in a natural state. In addition, the demand for eco-friendly packaging is recently increasing worldwide and domestically.

The above description has been possessed or acquired by the inventor(s) in the course of conceiving the present invention and is not necessarily an art publicly known before the present application is filed.

DISCLOSURE OF THE INVENTION

Technical Goals

An aspect provides a laminated film that is biodegradable/biologically disintegrable in a natural state.

An aspect provides a laminated film that is recyclable.

An aspect provides a laminated film that has barrier properties against oxygen and moisture while containing no aluminum material.

Technical Solutions

According to an aspect, there is provided a laminated film for eco-friendly packaging, the laminated film including a paper layer having barrier properties against oxygen and moisture, and a film layer that is biodegradable or biologically disintegrable by at least one of microorganisms, moisture, oxygen, light, and heat, wherein the laminated film may have an oxygen barrier property of 0.01 to 1 cc/m2-day and a moisture barrier property of 0.01 to 1 cc/m2-day.

The film layer may include one of polybutylene adipate terephthalate (PBAT), polybutylene succinate (PBS), polyhydroxyaldehyde (PHA), polylactic acid (PLA), thermoplastic starch (TPS), polyvinyl alcohol (PVA), polycaprolactone (PCL), Oxo-PE, and Oxo-PP, or a mixture of at least two thereof.

The film layer may include a biodegradable raw material and an oxidative biodegradable raw material in an amount of 20% or more.

The film layer may have a seal strength of 2 kgf/15 mm or more.

The film layer may have a thickness in the range of 10 to 250 μm.

The paper layer may have a basis weight of 30 to 200 g/m2, an oxygen barrier property of 1.0 cc/m2-day or less, and a moisture barrier property of 1 to 2 g/m2-day.

The laminated film may further include an adhesive layer for bonding the paper layer and the film layer.

The adhesive layer may include at least one of polyurethane-based, PVA-based, acrylic-based, ethylene-vinyl acetate (EVA)-based, and epoxy-based adhesives.

The adhesive layer may have a coat weight of 1 to 10 g/m2.

The laminated film may have a thickness of 500 μm or less.

Effects

According to example embodiments, a laminated film may be biodegraded/biologically disintegrable by at least one of microorganisms, moisture, oxygen, light, and heat.

According to example embodiments, a laminated film may be easily recycled.

According to example embodiments, a laminated film may have barrier properties against moisture and oxygen while containing no aluminum material.

The effects of the laminated film are not limited to the above-mentioned effects, and other unmentioned effects can be clearly understood from the above description by those having ordinary skill in the technical field to which the present disclosure pertains.

BRIEF DESCRIPTION OF DRAWINGS

FIG. 1 is a schematic cross-sectional view illustrating a laminated film according to an example embodiment.

BEST MODE FOR CARRYING OUT THE INVENTION

The present disclosure includes various example embodiments, and various changes may be made thereto. The accompanying drawing(s) are exemplarily provided for ease of description and are not intended to limit the example embodiments. Also, in the description of the example embodiments, detailed description of well-known related structures or functions will be omitted when it is deemed that such description will cause ambiguous interpretation of the present disclosure.

The conventional packaging was manufactured by applying aluminum foil to prevent the deterioration of content or food, that is, to prevent the inflow of oxygen and moisture. The conventional packaging to which aluminum foil is applied is formed of PET (or nylon)/aluminum/sealing layers (PE, PP) and thus, incapable of waste sorting for recycling.

In order to solve this issue, a method of depositing aluminum or alumina on PET or nylon to substitute for the aluminum foil or a method of coating PET or nylon with polymer-PVA, EVOH, or PVDC with excellent oxygen barrier properties was used. However, these methods merely reduce the use of aluminum, and could not be fundamental countermeasures against waste sorting and biodegradation.

Meanwhile, for waste sorting and biodegradation, barrier papers that block oxygen and moisture have been gradually developed. However, these barrier papers have barrier properties, specifically, an oxygen barrier property of 1 cc/m2-day or less and a moisture barrier property of 1 to 5.7 g/m2-day. These FIGURES fall short of the food packaging management standards. The food packaging management standards strictly manage the moisture barrier property for food that is deteriorated moisture, such as pet food, laver, and nuts to be 1 g/m2-day or less. Thus, barrier paper is difficult to apply to packaging for which a moisture barrier property is important.

Therefore, the present disclosure proposes a laminated film having barrier properties, specifically, a barrier property of 1 cc/m2-day or less and a moisture barrier property of 1 g/m2-day or less. In addition, the present disclosure provides a laminated film having biodegradability to be applied to eco-friendly packaging while having improved barrier properties against oxygen and moisture.

FIG. 1 is a schematic cross-sectional view illustrating a laminated film according to an example embodiment. However, it should be noted that FIG. 1 is exemplarily provided and is not intended to limit the position, size, and thickness of each element.

Referring to FIG. 1, a laminated film 1 may be applied to eco-friendly packaging for packaging a product. For example, the laminated film 1 may be applied to pet food packaging, layer packaging, nut packaging, dried food packaging, mask pack packaging, feed packaging, coffee pouch, and the like. However, examples are not limited thereto. The laminated film 1 may be used to package a variety of food or products.

The laminated film 1 may be biodegraded or biologically disintegrated. That is, the laminated film 1 may be degraded or disintegrated by microorganisms after being discarded in a general natural state. All elements of the laminated film 1 may be formed of a material that is 100% biodegradable or biologically disintegrable by microorganisms in a natural state. To this end, the laminated film 1 may not include a metal material. In particular, the laminated film 1 may not include an aluminum material. For example, the laminated film 1 may not include an aluminum layer and an aluminum-deposited film layer. In addition, the laminated film 1 does not contain an aluminum material and thus, is easy to recycle. Consequently, the laminated film 1 may be biodegradable (or biologically disintegrable) and recyclable, and thus eco-friendly. In addition, the laminated film 1 may have excellent barrier properties against oxygen and moisture and have excellent seal strength. For example, the laminated film 1 may have an oxygen barrier property of 1 cc/m2-day or less and a moisture barrier property of 1 g/m2-day or less. Preferably, the laminated film 1 may have an oxygen barrier property of 0.5 cc/m2-day or less and a moisture barrier property of 0.9 g/m2-day or less. The total thickness of the laminated film 1 may be 500 µm or less.

The laminated film 1 may include a paper layer 11, a film layer 12, and an adhesive layer 13.

The paper layer 11 may be disposed on an outer side of the laminated film 1. The film layer 12 may be laminated on one surface of the paper layer 11. Product information and graphics may be printed on the other surface of the paper layer 11. The paper layer 11 may have barrier properties against moisture and oxygen. For example, the paper layer 11 may have barrier properties, specifically, an oxygen barrier property of 1 cc/m2-day or less and a moisture barrier property of 1 to 2 g/m2-day. For example, the paper layer 11 may have a moisture barrier property of 1.2 to 2 g/m2-day.

The surface of the paper layer 11 may be treated with a material having barrier properties to suppress the permeability of paper. For example, the paper layer 11 may be sized or coated with a surface treatment material including starch or a starch inducer. As the starch, raw starch obtained by refining a substance selected from rice, corn, glutinous corn, barley, wheat, potato, and tapioca may be used. As the starch inducer, a starch inducer prepared by acid treatment, enzyme treatment, oxidation, esterification, or etherification of the substance may be used. Thereafter, the paper layer 11 may be calendared. The paper layer 11 may have improved density and surface evenness through the calendering process that compresses a material with heat and pressure. Thereafter, a coating film may be formed on the paper layer 11 such that the paper layer 11 may have barrier properties against moisture and oxygen. In addition, the paper layer 11 may have a basis weight of 30 to 200 g/m2. Preferably, the basis weight may be 50 to 100 g/m2. When the paper layer 11 has an overly low basis weight, the paper layer 11 may have high barrier properties but may fail to have the mechanical physical properties required by the packaging. When the paper layer 11 has an overly high basis weight, the paper layer 11 may have high mechanical physical properties but may fail to implement the barrier properties required herein. Meanwhile, the description of the paper layer is only an example, and paper layers in various configurations having barrier properties against moisture and oxygen may be used.

The film layer 12 may be disposed on an inner side of the laminated film 1. The film layer 12 may be laminated on one surface of the paper layer 11. The film layer 12 may be biodegraded (or biologically disintegrated). The film layer 12 may include a biodegradable film that is degradable by microorganisms and moisture, an oxidative biodegradable film that is degradable by heat and light (UV), and a bio-based film including the biodegradable raw material and oxidative biodegradable raw material in an amount of 20% or more. For example, the film layer 12 may include only one of polybutylene adipate terephthalate (PBAT), polybutylene succinate (PBS), polyhydroxyaldehyde (PHA), poly-lactic acid (PLA), thermoplastic starch (TPS), polyvinyl alcohol (PVA), polycaprolactam (PCL), Oxo-PE, and Oxo-PP, or a mixture of at least two thereof.

In addition, the film layer 12 may have a thickness of 10 µm to 250 µm. Preferably, the thickness may be 30 µm to 200 µm. When a film is thin, the film may have a low seal strength and may not withstand heavy-weight packaging. When the film is too thick, the cost of production may increase.

The film layer 12 may have a seal strength of 2 kgf/15 mm or more when the sealing temperature is 80 to 250° C. Preferably, the film layer 12 may have a sealing strength of 2 kgf/15 mm or more when the sealing temperature is 80 to 200° C. By laminating the film layer 12 having a seal strength of 2 kgf/15 mm or more, the moisture barrier property of the laminated film 1 may be lowered to 1 g/m2-day or less. Meanwhile, in general, in the case of pouch-type packaging, a heat sealing method is used for film adhesion, and the seal strength is evaluated to manage the separation issue in a portion sealed by heat. To determine the suitability of the film layer 12 used in the laminated film 1, the seal strength was measured by the following measurement method, and the results are shown in Table 1.

<Measurement Method>

Seal strength: measured using LLOYD's LDS universal tensile tester, with a grip spacing of 50 mm, a speed of 100 mm/min, and a width of sample to be measured of 15 mm.

TABLE 1

| Biodegradable/biologically disintegrable film | Seal strength (kgf/15 mm) |
|---|---|
| TPS 25% + PE 75% | 5.5 |
| PBAT + PLA | 2.5 |
| Oxo-PE | 5.7 |

Referring to Table 1, TPS, PBAT+PLA, and Oxo-PE that satisfy the seal strength of 2 kgf/15 mm or more may be suitable to be processed as packaging. For example, in using the TPS film as the film layer 12, at least one of PE, PS, and PP may be mixed with TPS in an amount of 10 to 70%. More precisely, considering the biodegradability and physical properties, the amount may be preferably 20 to 40%. In the above test, TPS 25% was mixed with PE (TPS 25%/PE 75%).

The adhesive layer 13 may be used to bond the paper layer 11 and the film layer 12. The adhesive layer 13 may be formed by an eco-friendly method. The adhesive layer 13 may include at least one of polyurethane-based, PVA-based, acrylic-based, ethylene-vinyl acetate (EVA)-based, and epoxy-based adhesives. The adhesive layer 13 may be formed by a non-solvent dry lamination method. For example, the adhesive layer 13 may include a two-liquid polyurethane-based adhesive to laminate the paper layer 11 and the film layer 12 by a non-solvent lamination method. In this case, the coat weight may be 1 to 10 g/m2. When the coat weight is less than 1 g/m2, it is difficult to obtain sufficient adhesion. When the coat weight is greater than 10 g/m2, the manufacturing cost may excessively increase. Meanwhile, the adhesive layer 13 may be formed by an extrusion lamination method using a biodegradable resin. The above description of the adhesive layer is merely an example, and the adhesive layer may be formed by various eco-friendly methods and adhesives.

According to this configuration, the laminated film 1 may have sufficient barrier properties against moisture and oxygen while containing no aluminum material, and furthermore may be 100% biodegradable and recyclable. Therefore, the laminated film 1 may be used as a substitute for aluminum-applied packaging, thereby preventing environmental pollution.

Hereinafter, the text results for laminated films according to example embodiments will be presented.

PREPARATION EXAMPLE

1. As a paper layer, barrier paper having barrier properties, specifically, an oxygen barrier property of 1 cc/m2-day or less and a moisture barrier property of 1.2 to 2 g/m2-day is used.
2. As a film layer, a biodegradable or biologically disintegrable film is used. For example, the film layer may be biodegraded or biologically disintegrated by at least one of microorganisms, moisture, heat, light, and oxygen. For example, as the film layer, one of BAT, PBS, PHA, PLA, TPS, PVA, PCL, Oxo-PE, and Oxo-PP films may be used alone, or a mixture of at least two may be used.
3. The paper layer and the film layer are laminated by a non-solvent lamination method using a two-liquid polyurethane-based adhesive. The coat weight may be 1 to 10 g/m$^2$.

<Example 1> (Laminated Film Including TPS Film)

The laminated film according to Example 1 has a structure in which a paper layer having barrier properties against oxygen and moisture and a biodegradable film layer having excellent seal strength are bonded with an adhesive. The laminated film according to Example 1 was prepared in the same manner as in Preparation Example using a TPS film for the film layer. Specifically, TPS 25% and PE were mixed and used as the film layer (TPS 25%/PE 75%).

A lamination process was used as the adhesion process. Specifically, the paper layer having an oxygen barrier property of 1 cc/m2-day or less and a moisture barrier property of 1.2 to 2 g/m2-day was coated with an adhesive by means of gravure or micro-gravure, and the biodegradable film layer with a material preparation composition ratio of TPS 25%/PE 75% was laminated thereon. The paper layer and the film layer were laminated by a non-solvent lamination method using a two-liquid polyurethane-based adhesive.

<Example 2> (Laminated Film Including Oxo-PE Film)

The laminated film was prepared in the same manner as in Preparation Example, and an Oxo-PE film was used as the film layer.

<Example 3> (Laminated Film Including PBAT/PLA Mixed Film)

The laminated film was prepared in the same manner as in Preparation Example, and a PBAT/PLA mixed film was used as the film layer.

<Comparative Example 1> (Laminated Film Using Normal LLDPE Film)

The laminated film was prepared in the same manner as in Preparation Example, using a normal LLDPE film that is not biodegradable.

<Comparative Example 2> (Laminated Film Using Existing Aluminum Layer)

The laminated film of Comparative Example 2 has the most common structure implementing barrier properties, and has a structure in which a PET layer that provides printing properties, an aluminum layer that blocks oxygen and moisture, a nylon layer that implements pinhole resistance, and a CPP layer that is a sealing layer are provided and bonded to each other by an adhesive. A lamination process was used to prepare the laminated film of Comparative Example 2. As the lamination method, general organic solvent-type dry lamination was used, and the coat weight of the adhesive is 1 to 10 g/m$^2$.

<Comparative Example 3> (Laminated Film Using Aluminum-Deposited Film)

The laminated film was prepared in the same manner as in Comparative Example 2, wherein an aluminum-deposited PET layer that blocks oxygen and moisture was used instead of the aluminum layer, and LLDPE that is not biodegradable was used instead of the CPP layer as a sealing layer.

<Comparative Example 4> (Laminated Film Using Normal Paper and General-Purpose LLDPE Film)

Normal paper without oxygen and moisture barrier properties and a general-purpose LLDPE film that is not biodegradable were used, and the laminated film was prepared by bonding the layers by a dry lamination method using an organic solvent.

<Comparative Example 5> (Laminated Film Using Normal Paper and TPS Film)

Normal paper without oxygen and moisture barrier properties and a film prepared by mixing TPS, more specifically, TPS 20 to 30% and LLDPE 70 to 80%, were used, and the laminated film was prepared by bonding the layers by a dry lamination method using an organic solvent.

<Comparative Example 6> (Barrier Paper)

For comparing the barrier properties of laminated films, paper having an oxygen barrier property of 1 cc/m$^2$-day or less and a moisture barrier property of 1.2 to 2 g/m$^2$-day was used.

<Comparative Example 7> (Normal Paper)

For comparing the barrier properties of laminated films, paper having no oxygen and moisture barrier properties was used.

<Measurement Method>

The oxygen and moisture barrier properties of Examples and Comparative Examples were measured under the following conditions.

Moisture vapor transmission rate (MVTR): measured using Mocon's Permatran-w3/33 moisture permeability meter under the condition that the temperature is 38±0.5° C. and the relative humidity is 90±2%.

Oxygen transmission rate (OTR): measured using Labthink's OX2/230 oxygen permeability meter under the condition that the temperature is 23±0.5° C.

<Measurement Results>

The barrier properties measurement results of Examples and Comparative Examples and whether their laminated films are biodegradable are listed in Table 2 below.

Referring to Table 2, the laminated films according to example embodiments have barrier properties, specifically, an oxygen barrier property of 1 cc/m$^2$-day or less and a moisture barrier property of 1 g/m$^2$-day or less, and simultaneously have biodegradability. On the contrary, the laminated films of Comparative Examples 1 to 5 do not have biodegradability, and the laminated films of Comparative Examples 6 and 7 have a moisture barrier property of 1 g/m$^2$-day or more and thus, do not have sufficient barrier properties.

Consequently, the laminated films according to the present disclosure may have sufficient barrier properties against oxygen and moisture. Therefore, the laminated films according to the present disclosure may be used for food packaging. In particular, the laminated films according to the present disclosure may be used for packaging for pet food, laver, and nuts, for which the standard for a moisture barrier property is 1.0 g/m$^2$-day or less. In addition, the laminated films according to the present disclosure have sufficient barrier properties and simultaneously biodegradability, and thus, are easy to recycle and eco-friendly.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A laminated film for eco-friendly packaging, the laminated film comprising:
a paper layer having barrier properties against oxygen and moisture; and
a film layer that is biodegradable or biologically disintegrable by at least one of microorganisms, moisture, oxygen, light, and heat,
wherein the paper layer has a basis weight of 50 to 100 g/m$^2$, an oxygen barrier property of 1.0 cc/m$^2$-day or less, and a moisture barrier property of 1 to 2 g/m$^2$-day,
wherein the laminated film has an oxygen barrier property of 0.01 to 1 cc/m$^2$-day and a moisture barrier property of 0.01 to 1 cc/m$^2$-day,

TABLE 2

| | Structure | OTR (cc/m$^2$-day) | MVTR (g/m$^2$-day) | Biodegradability |
|---|---|---|---|---|
| Example 1 | Barrier paper/TPS 25% PE 75% | 0.28 | 0.61 | ○ |
| Example 2 | Barrier paper/Oxo-PE | 0.22 | 0.71 | ○ |
| Example 3 | Barrier paper/PBAT + PLA | 0.3 | 0.73 | ○ |
| Comparative Example 1 | Barrier paper/LLDPE | 0.28 | 1.2 | X |
| Comparative Example 2 | PET/Aluminum/Nylon/CPP | 0.09 | 0.07 | X |
| Comparative Example 3 | PET/Deposited PET/Nylon/LLDPE | 1.2 | 1.6 | X |
| Comparative Example 4 | Normal paper/LLDPE film | 4000↑ | 4 | X |
| Comparative Example 5 | Normal paper/TPS Film | 4000↑ | 7 | ○ |
| Comparative Example 6 | Barrier paper | 0.3 | 1.4 | ○ |
| Comparative Example 7 | Normal paper | 4000↑ | 4000↑ | ○ | wherein the laminated film is a two-layer film composed of the paper layer and the film layer and optionally an adhesive bonding the paper layer and film layer, wherein the film layer is laminated on an inner surface of the paper layer so that when the laminated film is applied to the packaging, the film layer faces an inner side of the packaging and the paper layer faces an outer side of the packaging.

2. The laminated film of claim 1, wherein the film layer comprises one of polybutylene adipate terephthalate (PBAT), polybutylene succinate (PBS), polyhydroxyaldehyde (PHA), polylactic acid (PLA), thermoplastic starch (TPS), polyvinyl alcohol (PVA), polycaprolactone (PCL), Oxo-PE, and Oxo-PP, or a mixture of at least two thereof.

3. The laminated film of claim 1, wherein the film layer comprises a biodegradable raw material and an oxidative biodegradable raw material in an amount of 20% or more.

4. The laminated film of claim 2, wherein the film layer has a seal strength of 2 kgf/15 mm or more.

5. The laminated film of claim 2, wherein the film layer has a thickness in the range of 10 to 250 μm.

6. The laminated film of claim 1, comprising the adhesive for bonding the paper layer and the film layer.

7. The laminated film of claim 6, wherein the adhesive comprises at least one of polyurethane-based, PVA-based, acrylic-based, ethylene-vinyl acetate (EVA)-based, and epoxy-based adhesives.

8. The laminated film of claim 7, wherein the adhesive has a coat weight of 1 to 10 $g/m^2$.

9. The laminated film of claim 1, wherein the laminated film has a thickness of 500 μm or less.

* * * * *